UNITED STATES PATENT OFFICE.

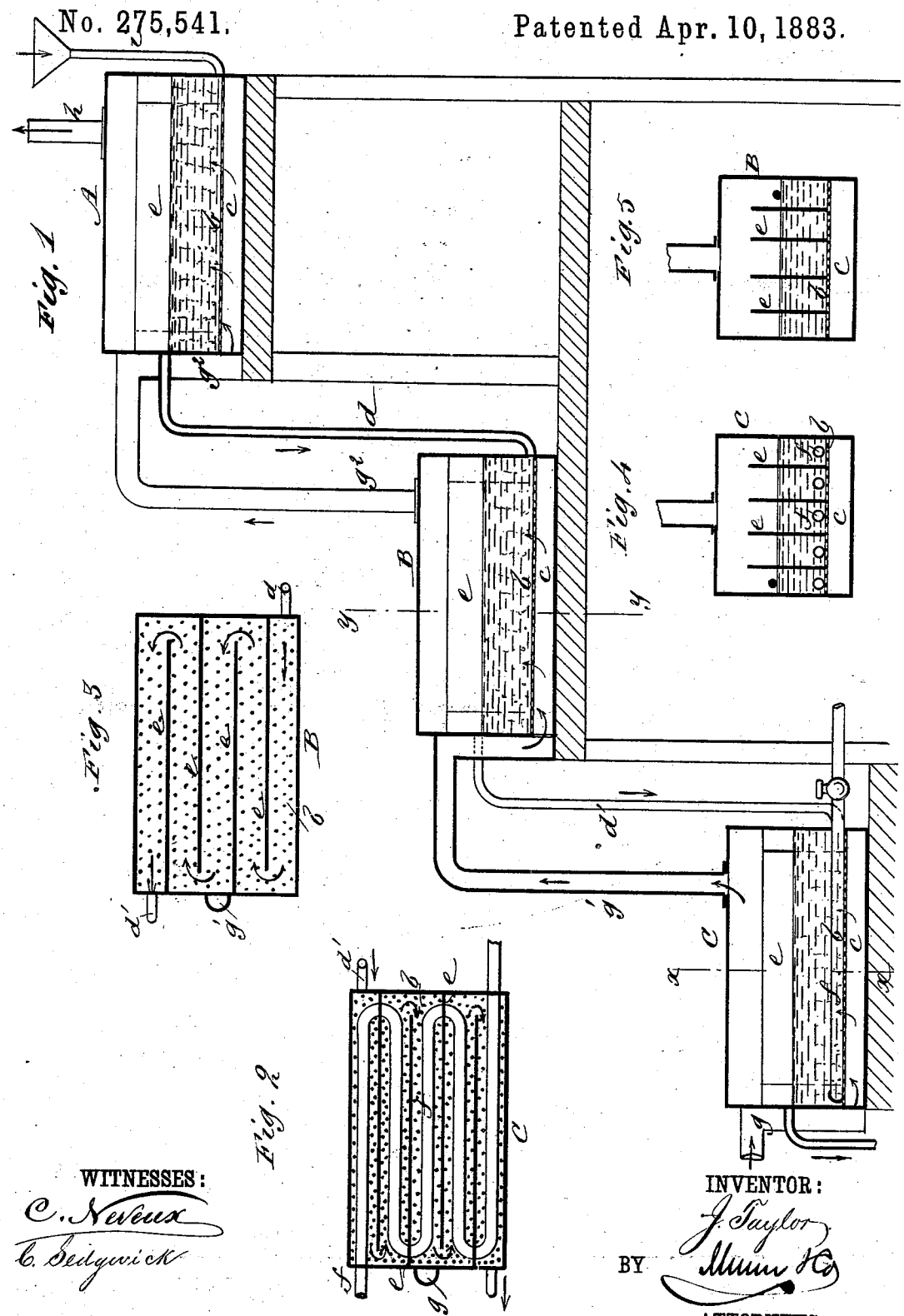

JOHN TAYLOR, OF HALIFAX, NOVA SCOTIA, CANADA.

APPARATUS FOR PURIFYING FOUL AMMONIACAL LIQUORS.

SPECIFICATION forming part of Letters Patent No. 275,541, dated April 10, 1883.

Application filed May 18, 1882. (No model.)

*To all whom it may concern:*

Be it known that I, JOHN TAYLOR, of Halifax, Nova Scotia, Canada, have invented a new and useful Improvement in Purifying or Revivifying Foul Ammoniacal Liquor, of which the following is a full, clear, and exact description.

This invention is mainly designed to be used in connection with gas-works; and it has for its object the purification of crude gas by means of the ammonia contained in it. Heretofore the great obstacle to the attainment of this result has been the difficulty of cheaply eliminating the two impurities—sulphureted hydrogen and carbonic acid—from the foul liquor, or, in other words, of revivifying the foul ammoniacal liquor.

My invention consists in a simple and effective apparatus or means therefor in or by which cold or heated atmospheric air is forced through the foul gas-liquor for the purpose of expelling the sulphureted hydrogen.

Reference is to be had to the accompanying drawings, forming a part of this specification, in which similar letters of reference indicate corresponding parts in all the figures.

Figure 1 represents a vertical section of an apparatus adapted to carry out my invention and constructed in accordance with it. Fig. 2 is a plan, with the top or cover removed, of one of a series of close iron tanks or vessels used in the apparatus for the treatment of the liquor. Fig. 3 is a similar view of another of said tanks; and Figs. 4 and 5, vertical transverse sections on the lines $x$ $x$ and $y$ $y$, respectively.

In the drawings, three close tanks, A B C, for treatment of the liquor, are shown; but any lesser or greater number than these may be used. These tanks, which may be of iron, are arranged each one higher than the other, and are placed at such a height one above the other that the liquor in falling from one tank to the next one beneath it will have sufficient head to overcome the pressure of air in the lower one of said tanks. Each of these tanks A B C is fitted with a perforated false bottom, $b$, beneath which an air space or chamber is formed, while the liquor to be treated partly occupies the space in the tanks above said false bottoms and passes from each upper to its next lower tank successively by overflow-pipes $d$ $d'$, respectively. The liquor in thus passing from one tank to the other, and in being drawn off from the lower one, is made to circulate within the tanks to produce a fuller or better exposure of the liquor to the air by means of vertical partitions $e$ $e$, arranged to produce a circulation between the inlet for the liquor and the outlet or overflow therefor, said partitions resting upon the perforated bottom $b$ of each tank and connecting alternately with opposite ends of the tank, thereby forming a series of return spaces or channels, with the first one of which the inlet for the liquor connects below, and with the last one of which the outlet of the overflow connects above. The lowermost one, C, of the three tanks here shown is also fitted immediately over its false bottom with a coil of steam-pipes, $f$, whereby the liquor may be heated to any convenient degree. Atmospheric air is blown by a steam-jet blower, or any other suitable device, through a pipe, $g$, first into the space $c$, below the perforated bottom of the tank C, and, after percolating through the liquor in said tank, passing, by a pipe, $g'$, into the space $c$ of the next tank above, B, from whence it percolates in that tank, and so on by a further pipe, $g^2$, passes to and through the liquor in the upper tank, A, after which it escapes by an outlet, $h$.

The process is a continuous one by keeping up a constant supply of foul ammoniacal liquor, which enters the upper tank, A, by a pipe, $i$, and passes successively from tank to tank in a downward direction and circulates in a circuitous manner through the tanks, as described, subject during its passage therethrough to its exposure by agitation and percolation of atmospheric air in forced currents or streams with or without the application of heat. The driving of atmospheric air through the foul gas-liquor is the leading or principal feature of this process for revivifying said liquor.

By employing a series of tanks for treatment of the liquor, as described, the air-supply is economized, a given bulk of air cleaning a greater quantity of liquor. This method of revivifying the liquor will be found greatly superior to the various processes heretofore proposed for the same purpose, including the treatment of the liquor with oxide of iron and the fixed alkalies. Before the current of air is turned on, the vessels are full of ammoniacal liquor to the level of overflow, the liquor resting upon the real bottom of each vessel. When the blast of air is turned on, the latter will spread itself and close to and under the false bottom, passing through the holes in it and bubbling through the liquor. If there is much space between the false and true bottom, then a layer of liquor is left upon the latter, the air forcing itself between the layer and the false bottom. When the air-current is turned off, the liquor, by its weight, fills up the space between the false and true bottom, the air which was there at the moment of turning off bubbling through the liquor to its top, so that the liquor cannot fill the space between the two bottoms when the current of air is on, the pressure of the blast supporting the liquid on the false bottom.

Having thus described my invention, I claim as new and desire to secure by Letters Patent—

1. In an apparatus for purifying or revivifying foul ammoniacal liquor, the combination of one or more tanks having perforated false bottoms for containing the foul liquor to be treated, an air duct or chamber beneath each of said bottoms for supplying a forced current of air through said perforated bottom and liquor resting thereon, an inlet for either tank for keeping up a constant supply of foul liquor thereto, an overflow-pipe for running off the liquor therefrom, and circulating devices for extending the flow of the liquor through the tank or tanks, substantially as specified.

2. The combination of two or more tanks having perforated false bottoms and arranged one above the other, a continuous supply-pipe of foul ammoniacal liquor to the upper tank, overflow-pipes connecting each upper with each lower tank, air ducts and chambers arranged to supply each tank below its false bottom with a forced current of atmospheric air, and to pass said air, after it has percolated through the liquor in one tank, to similarly percolate through the liquor in the tank next above it, and an escape pipe or outlet for the air from the uppermost tank, essentially as shown and described.

3. The combination, with either tank in which the liquor is treated, of the perforated false bottom $b$, an inlet below said bottom for the admission of a forced supply of air, a lower inlet and upper outlet for the liquor above said bottom on opposite sides of the tank, the partitions $e$, arranged to produce a circulation between said inlet and outlet, and an escape pipe or outlet for the air from the upper portion of the tank, substantially as specified.

4. The combination, with either tank having a perforated false bottom, $b$, of the coil of steam-pipes $f$ above such false bottom, and the liquor-circulating partitions $e$, essentially as shown and described, and for the purpose herein set forth.

JOHN TAYLOR.

Witnesses:
CHAS. F. HAGARTY,
JAS. W. CALDWELL.